(12) United States Patent
Sugiura

(10) Patent No.: US 9,496,811 B2
(45) Date of Patent: Nov. 15, 2016

(54) DRIVING DEVICE AND DRIVING METHOD FOR MOTOR, COOLING DEVICE AND ELECTRONIC MACHINE

(71) Applicant: ROHM CO., LTD., Ukyo-Ku, Kyoto (JP)

(72) Inventor: Kenji Sugiura, Kyoto (JP)

(73) Assignee: ROHM CO. LTD., Kyoto (JP)

(*) Notice: Subject to any disclaimer, the term of this patent is extended or adjusted under 35 U.S.C. 154(b) by 83 days.

(21) Appl. No.: 14/535,623

(22) Filed: Nov. 7, 2014

(65) Prior Publication Data

US 2015/0130378 A1 May 14, 2015

(30) Foreign Application Priority Data

Nov. 11, 2013 (JP) .................... 2013-232962

(51) Int. Cl.
*H03K 5/00* (2006.01)
*H02P 6/18* (2016.01)

(52) U.S. Cl.
CPC ................. *H02P 6/182* (2013.01); *H02P 6/15* (2016.02)

(58) Field of Classification Search
CPC ........ H02M 5/45; H02P 27/085; H02P 5/00; H02P 7/29
See application file for complete search history.

(56) References Cited

U.S. PATENT DOCUMENTS

2012/0256575 A1* 10/2012 Chien .................. H02P 6/24
318/400.35

* cited by examiner

*Primary Examiner* — Karen Masih
(74) *Attorney, Agent, or Firm* — Cantor Colburn LLP

(57) ABSTRACT

The present disclosure provides a device and a method for driving a motor that demonstrates low noise and/or low vibration. A pulse-modulated control pulse signal S2 is generated by a driving signal generation portion 310 at each phase. A driving voltage $V_U \sim V_W$, with duty cycle corresponding to the control pulse signal S2 and being inserted with specific idle time is applied to coils $L_U \sim L_W$ at each phase. A current phase detection signal S3 indicating a phase of the current $I_L$ flowing through the coil $L_U$ is generated by the current phase detection portion 330 at a specific phase (the phase U) corresponding to the control pulse signal S2 according to a pulse width of a terminal voltage $V_U$ at one end of the coil $L_U$ of the phase U.

19 Claims, 6 Drawing Sheets

DRIVING DEVICE AND DRIVING METHOD FOR MOTOR, COOLING DEVICE AND ELECTRONIC MACHINE

CROSS REFERENCE

The present invention claims priority under 35 U.S.C. §119 to Japanese Application No. 2013-232962, filed Nov. 11, 2013, the entire content of which is incorporated herein by reference.

BACKGROUND

The present disclosure relates to a motor driving technology.

In a motor such as a brushless direct current motor having no reverse mechanism, a direction of current provided in a coil is switched according to a position of a rotor. The driving method for the brushless direct current motor can be divided into following two types: using position information of a rotor acquired from a Hall element, and by speculating a position of a rotor according to a zero crossing point of counter-electromotive force (induced voltage) generated on a coil without using a Hall element.

120-degree conduction driving and 180-degree conduction driving (sinusoidal wave driving) are methods widely used to control three-phase brushless motors. In comparison with the 180-degree conduction driving, the 120-degree conduction driving is easier to be controlled but produces greater noise and vibration. On the other hand, in comparison with the 120-degree conduction driving and the 150-degree conduction driving, the 180-degree conduction driving has outstanding silent property, vibration property, and better efficiency. However, once the driving process is not synchronous, the 180-degree conduction driving is more difficult to be controlled than the 120-degree conduction driving. Hence, the 180-degree conduction driving is more complex than the 120-degree conduction driving.

THE PRIOR TECHNICAL LITERATURES

Patent Literatures

[patent literature 1] Japanese patent application publication No. 2010-285982

BRIEF SUMMARY OF THE INVENTION

The Problem to be Solved by the Present Invention

Current passing through a coil has to be zero in order to detect counter electromotive force under circumstances that no sensor is available.

In 120-degree conduction driving, for a certain phase of the coil, a 120 degree positive conduction period, a 60-degree non-conduction period, a 120-degree negative conduction period, and a 60-degree non-conduction period are repeated. Hence, counter electromotive force may be easily detected by utilizing the 60-degree non-conduction period.

On the other hand, in the 180-degree conduction driving (sinusoidal wave driving), current always flows in each coil, and hence no non-conduction period can be used like that the 120-degree conduction driving. Therefore, in the 180-degree conduction driving, a detection period has to be set according to time at which a zero crossing point of counter electromotive force is generated, and an output of a driver in the detection period is forcibly set as high impedance.

In order to obtain decent silent property of a fan motor, the 180-degree sinusoidal wave driving is used. However, if the position of a rotor is to be detected or a longer detection period (a non-conduction period) is set for detecting a phase of coil current, the original advantage, i.e. silent property, of the 180-degree conduction driving is deteriorated. In addition, the vibration occurs.

The present disclosure is achieved in light of the above situations. One aspect of the present disclosure is to provide a motor driving device for driving a motor. The motor demonstrates low noise and/or low vibration.

The Technical Means for Solving the Problem

One aspect of the present disclosure relates to a driving device for a brushless direct current motor. The driving device includes a driving signal generation portion for generating a pulse-modulated control pulse signal at each phase; a driver for generating a driving voltage with duty cycle corresponding to the control pulse signal, the driving voltage being inserted with specific idle time, and applying the driving voltage to a coil at each phase; and a current phase detection portion for generating a current phase detection signal indicating a phase of current flowing in a coil at a specific phase corresponding to the control pulse signal, according to a pulse width of a terminal voltage of a terminal of a coil at the specific phase.

During the idle time, one end of the coil becomes high impedance status. When the coil current flows toward the coil from the driver (referred to as a source-out direction), the terminal voltage is approximately a ground voltage, and when the coil current flows toward the driver from the coil (referred to as a drain-in direction), the terminal voltage is approximately a power source voltage. Therefore, the duration of the idle time is changed by a pulse width of the terminal voltage during the idle time according to the direction of the coil current.

In accordance with the embodiment, by using the pulse width of the terminal voltage, the phase information of the coil current can be obtained without inserting the non-conduction period, so as to drive a motor that demonstrates low noise and/or low vibration.

Further, in this present disclosure, the pulse width is referred to as duration of a high level period or duration of a low level period of a rectangular signal.

The current phase detection signal may also be generated by the current phase detection portion based on the relationship between the pulse width of the control pulse signal and the pulse width of the terminal voltage.

Since the control pulse signal is pulse modulated, the duty cycle (pulse width) thereof is changed instantaneously. According to this embodiment, the direction of the coil current may be determined at any time sequence based on the relative relationship between the pulse width of the control pulse signal and the pulse width of the terminal voltage.

In one embodiment, the driving device may further include a frequency modulation portion for modulating frequency of a conductive waveform based on the current phase detection signal.

Accordingly, the motor can rotate with a high torque and/or high efficiency.

The frequency modulation portion may also make a current zero crossing point at direction inversion of the coil current of the specific phase and a phase reference satisfy a specific relationship, so as to modulate the frequency of the conductive waveform based on the current phase detection signal.

In the time sequence set according to the phase reference, the frequency of the conductive waveform may also be modulated by the frequency modulation portion based on the direction of the coil current shown by the current phase detection signal.

The current zero crossing point at direction inversion of the current coil of the specific phase may also be detected by the frequency modulation portion based on a plurality of current phase detection signals in a complete period.

By monitoring the current phase detection signal during a complete period, direction inversion of the current indicated by the current phase detection signal may be detected.

The current phase detection portion may also include a voltage comparator for comparing a driving voltage and a predetermined threshold voltage, and outputting a detection pulse signal; a counter for detecting a pulse width of a detection pulse signal and generating a pulse width detection value; and a digital comparator for comparing a pulse width instruction value corresponding to the pulse width of the control pulse signal with the pulse width detection value.

The driver may also include a high-voltage side transistor and a low-voltage side transistor. A value obtained by adding the pulse width instruction value indicating on time of the high-voltage side transistor and a constant is compared to the pulse width detection value by the digital comparator. The constant may be set according to the duration of the idle time.

The brushless direct current motor is a three-phase motor, and the current phase detection portion may also compare the pulse width of the control pulse signal with the pulse width of the terminal voltage at each of the U phase, V phase and W phase.

Accordingly, the responsivity is increased.

The brushless direct current motor is a three-phase motor, and the current phase detection portion may also compare the pulse width of the control pulse signal and the pulse width of the terminal voltage at both the coil current increasing period and the coil current decreasing period.

Accordingly, the responsivity is increased.

The threshold voltage may also be about ½ of the high level voltage of the driving voltage.

In one embodiment, the driving device may also include a phase modulation portion for modulating a phase of a pulse signal based on a current phase detection signal.

In one embodiment, the driving device may also include a voltage zero crossing detection portion for detecting a voltage zero crossing point at which an induced voltage of a coil at a specific phase is zero. The phase modulation portion may also modulate a phase of a pulse signal by making the current zero crossing point consistent with the voltage zero crossing point at direction inversion of the coil current with a specific phase.

The voltage zero crossing detection portion may also include a Hall comparator for comparing a pair of Hall signals from a Hall element indicating a position of a rotor of the brushless direct current motor, and generating a Hall detection signal.

The voltage zero crossing detection portion may also include a counter-electromotive force detection comparator for comparing the terminal voltage and a middle voltage of the coil when the terminal of the coil of a specific phase of the brushless direct current motor is in a high impedance status.

The brushless direct current motor may also be a fan motor.

Another embodiment of the present disclosure relates to a cooling device. The cooling device may also include a fan motor and any one of the above driving devices for driving the fan motor.

Still another embodiment of the present disclosure relates to an electronic machine. The electronic machine may also include the above cooling device.

Moreover, it is also an effective embodiment that the above essential elements of the present disclosure are arbitrarily combined or the essential elements, method, devices and systems of the present disclosure are replaced with each other.

Effects of the Present Disclosure

In accordance with an embodiment of the present disclosure, a motor demonstrates low noise and/or low vibration.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
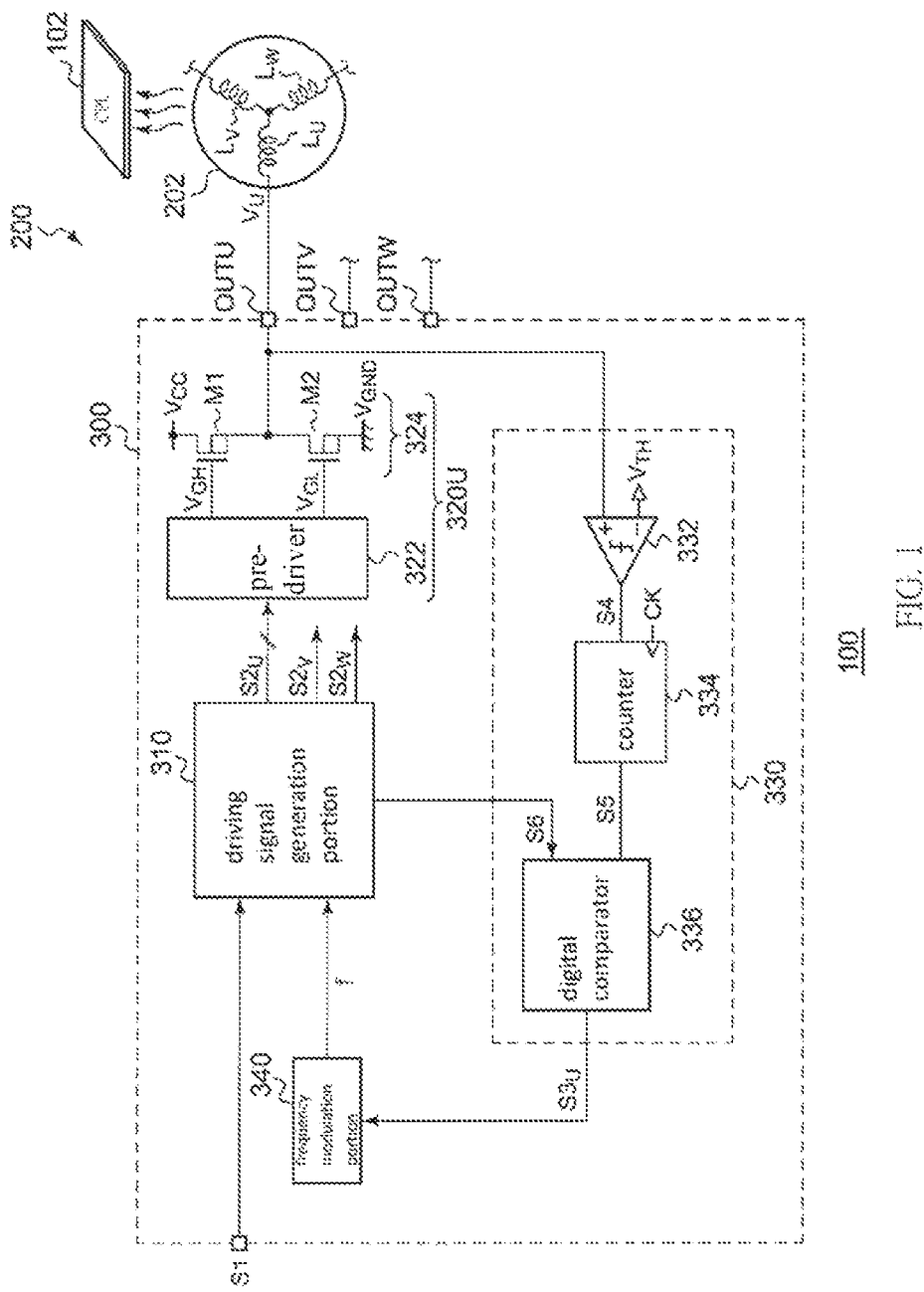
FIG. 1 is a block diagram showing an electronic machine with a cooling device in accordance with a first embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In the following descriptions, the present disclosure is discussed in light of drawings based on preferred embodiments. Similar or identical essential elements, components and processing are referred to the same reference numerals, and the repeated descriptions are properly omitted. Further, embodiments are exemplary but not for limiting the present disclosure, and all features or a combination thereof of embodiments are not necessary for the nature of the present disclosure.

In this specification, the phrase "the connection status of a component A and a component B" is referred to not only that the component A is physically and directly connected to the component B, but also that the component A is indirectly connected to the component B without substantially affecting the connection status or damaging functions or effects brought about by the connection status.

Similarly, the description "a component C is disposed between a component A and a component B" is referred to not only that the component A is directly connected to the component C or the component B is directly connected to the component C, but also that the indirection connection without substantially affecting the connection status or damaging functions or effects brought about by the connection status.

First Embodiment

FIG. 1 is a block diagram showing an electronic machine 100 with a cooling device 200 in a first embodiment of the present disclosure. The electronic machine 100 is a computer such as a personal computer, a work station and etc., or a home appliance such as a refrigerator or a TV, and has an object to be cooled such as a CPU (central processing unit) 120. The CPU 120 is cooled by the cooling device 200 via blowing air.

The cooling device 200 includes a fan motor 202 and a driving device 300. The fan motor 202 is a three-phase brushless direct current motor, and is arranged to be close to the CPU 102. The fan motor 202 is driven by the driving device 300 based on a control input signal (hereinafter "control signal") S1 indicating a torque (a rotation number or an applied voltage) of the fan motor 202. The cooling device 200 is modularized to be commercially sold.

The fan motor 202 includes a star wiring having coils $L_U$, $L_V$ and $L_W$ with a phase U, a phase V and a phase L, respectively, and a permanent magnet (not shown). The driving device 300 is integrated to a functional IC on a semiconductor substrate. A power supply voltage $V_{CC}$ is provided to a power supply terminal of the driving device 300, and a ground voltage $V_{GND}$ is provided to a ground terminal of the driving device 300. Further, output terminals OUTU~OUTW of the driving device 300 are connected to the respective end of the coils $L_U$, $L_V$ and $L_W$ of the fan motor 202.

The driving device 300 includes a driving signal generation portion 310, a driver 320, and a current phase detection portion 330. The driving device 200 performs the 180-degree sinusoidal wave driving on the fan motor 202.

A pulse-modulated control pulse signal S2 is generated at each phase by the driving signal generation portion 310. The control pulse signal S2 is smoothed to form a signal with a sinusoidal wave or the like, and amplitude of the smoothed signal is corresponding to the control signal S1. In this embodiment, the control pulse signals $S2_U$~$S1_W$ for each of the phase U, the phase V and the Phase W, respectively, are generated by the driving signal generation portion 310. FIG. 1 only shows the phase U.

For each of the phase U, the phase V and the phase W, driving voltages $V_U$, $V_V$ and $V_W$ with duty cycle corresponding to the control pulse signals $S2_U$, $S2_V$, $S2_W$ and being inserted with specific idle time $T_D$ are generated by the driver 320. The driving voltages are applied to one end of each of the coils $L_U$, $L_V$ and $L_W$ with the phase U, the phase V, and the phase W by the driver 320.

For example, the driver 320 includes a pre-driver 322 and a bridging circuit 324. The bridging circuit 324 is configured in a push-pull fashion and includes a high-voltage side transistor M1 and a low-voltage side transistor M2. The pre-driver 322 repeats the following in sequence based on the control pulse signal S2: high level period $T_{ON}$ for conducting the high-voltage side transistor M1 and cutting off the low-voltage side transistor M2; idle time $T_D$ for cutting off both the high-voltage side transistor M1 and the low-voltage side transistor M2; low level time $T_{OFF}$ for cutting off the high-voltage side transistor M1 and conducting the low-voltage side transistor M2; and idle time $T_D$ for cutting off both the high-voltage side transistor M1 and the low-voltage side transistor M2.

The driving voltage $V_U$ becomes the power supply voltage $V_{CC}$ at the high level period $T_{ON}$, and the driving voltage $V_U$ becomes a ground voltage $V_{GND}$ at the low level time $T_{OFF}$.

A current phase detection signal $S3_U$ which indicates a phase of current $I_U$ flowing through the coil $L_U$ and corresponds to the control pulse signal $S2_U$ is generated at a specific phase (here refers to a phase U) by the current phase detection portion 330, according to a pulse width of a terminal voltage $V_U$ of a terminal (OUTU) of the coil $L_U$ at the phase U.

Preferably, the current phase detection signal $S3_U$ is generated by the current phase detection portion 330, according to a relationship between the pulse width of the control pulse signal $S2_U$ and the pulse width of the terminal voltage $V_U$.

Figure 2B:
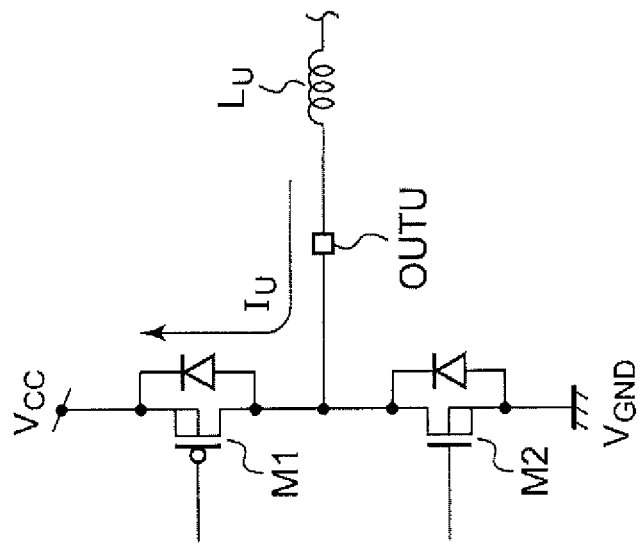
FIG. 2A and FIG. 2B are circuit diagrams showing the respective status of a driver during the idle time in accordance with some embodiments of the present disclosure.
Figure 2A:
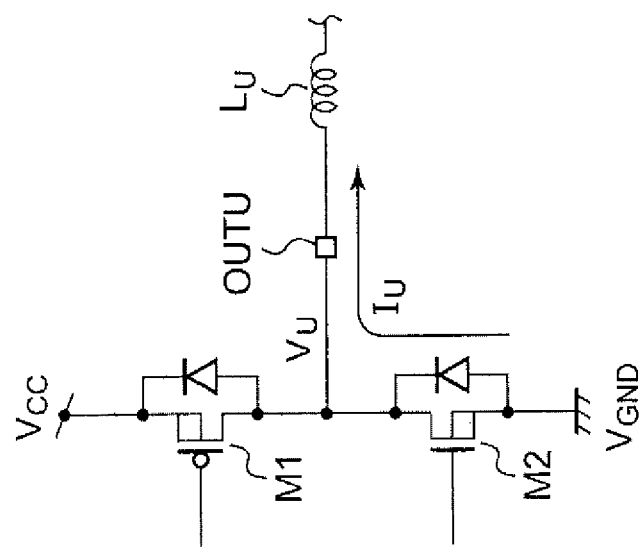

FIG. 2A and FIG. 2B are circuit diagrams showing the status of the driver 320 during the idle time. During the idle time, both the high-voltage side transistor M1 and the low-voltage side transistor M2 are cut off, and the output terminal OUTU becomes high impedance status. FIG. 2A shows the status when the coil current $I_U$ flows into the coil $L_U$ from the driver 320 (referred to as a source-out direction) during the idle time. Therefore, the terminal voltage $V_U$ becomes approximately to the ground voltage $V_{GND}$.

FIG. 2B shows the status when the coil current $I_U$ flows into the driver 320 from the coil $L_U$ (referred to as a drain-in direction) during the idle time. At this time, the coil current $I_U$ flows through a body diode of the high-voltage side transistor M1. Hence, the terminal voltage $V_U$ becomes approximately the power supply voltage $V_{CC}$.

Figure 3:
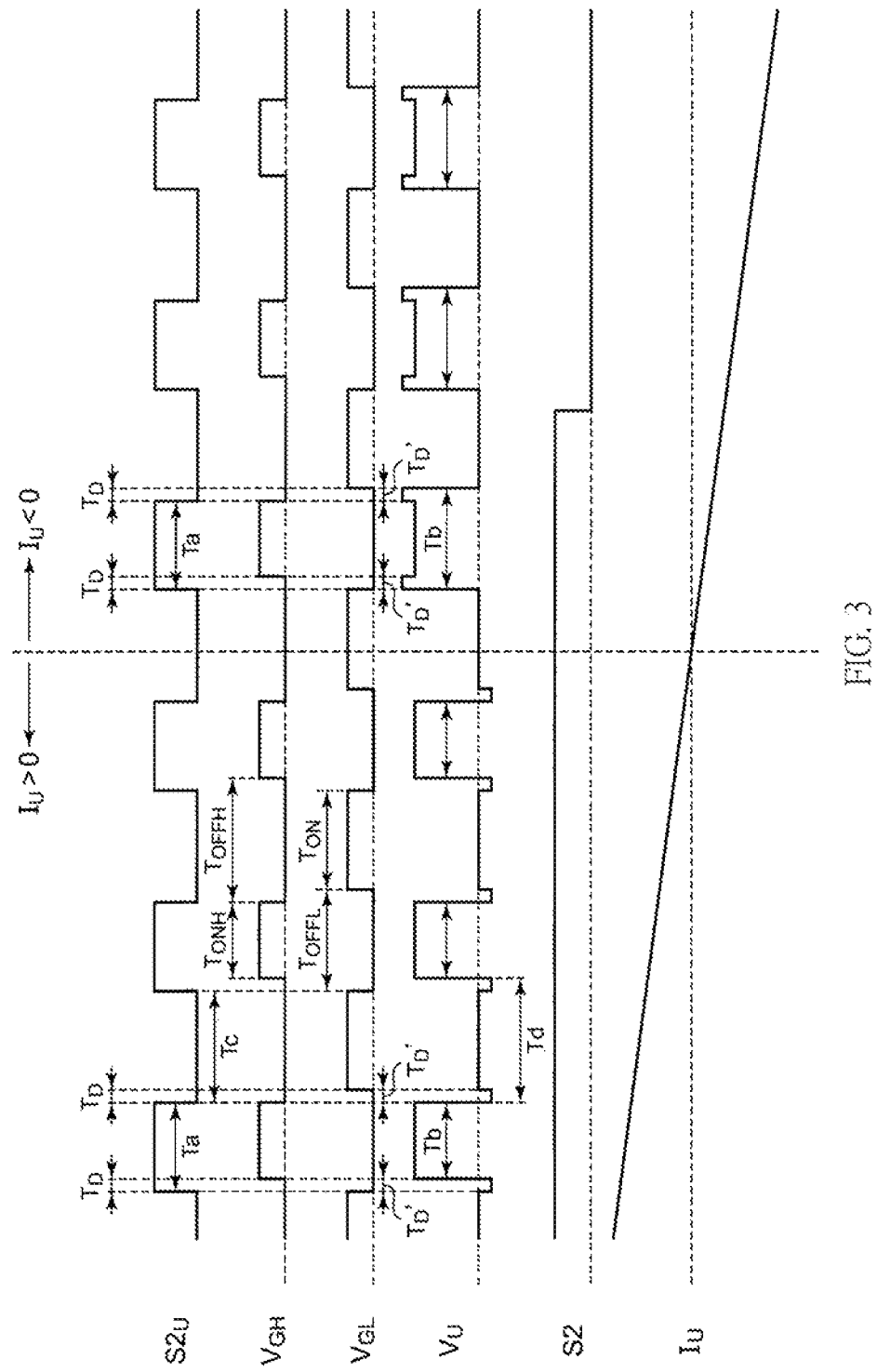
FIG. 3 is a waveform diagram showing a status of the driver in accordance with some embodiments of the present disclosure.

FIG. 3 is a waveform diagram showing the status of the driver 320. In this embodiment, a duration of a gate pulse signal $V_{GH}$ of the high-voltage side transistor M1 is shorter than the high level period of the control pulse signal S2, therefore, the idle time $T_D$ becomes high level; and a duration of a gate pulse signal $V_{GL}$ of the low-voltage side transistor M2 is greater than the high level period of the control pulse signal S2, therefore, the idle time $T_D$ becomes high level.

During the period when $I_U>0$, the pulse width Tb of the terminal voltage $V_U$ is longer than the pulse width Ta of the control pulse signal S2. On the contrary, during the period when $I_U>0$, the pulse width Tb of the terminal voltage $V_U$ is shorterlonger than the pulse width Ta of the control pulse signal S2.

Using this property, the direction, i.e. the phase information of the coil current $I_U$, is obtained by the current phase detection portion 330 based on the pulse width of the terminal voltage $V_U$.

Please refer back to FIG. 1. There is no specific limitation to the configuration of the current phase detection portion 330. For example, the current phase detection portion 330 includes a voltage comparator 332, a counter 334, and a digital comparator 336.

The voltage comparator 332 compares terminal voltage $V_U$ with a specific threshold voltage $V_{TH}$ and outputs a detection pulse signal S4. The pulse width (period Tb of the high level in this embodiment) of the detection pulse signal S4 is detected by the counter 334 using a clock signal CK, so as to generate a pulse width detection value S5.

A pulse width instruction value S6 corresponding to the pulse width Ta of the current control pulse signal $S2_U$ is output to the digital comparator 336 by the driving signal generation portion 310. The pulse width instruction value S6 and the pulse width detection value S5 are compared by the digital comparator 336, so as to determine the direction of the coil current $I_U$, and generate a current phase detection signal $S3_U$ corresponding to the determination result.

The pulse width instruction value S6 may also indicate the on time $T_{ONH}$ of the high-voltage side transistor M1. The value obtained by adding the pulse width instruction value S6 and a constant K is compared with the pulse width detection value S5 by the digital comparator 336. The constant K may be set according to the duration of the idle time $T_D$. The pulse width instruction value S6 indicates the conduction period $T_{ONH}$ of the high-voltage side transistor M1 in a unit of a period $T_{CK}$ of the clock signal CK. When the constant K indicates the duration of the idle time $T_D$ in a unit of a period $T_{CK}$ of the clock signal CK, S6+K and S5 are compared by the digital comparator 336. S6+K corresponds to Ta in FIG. 3, and S5 corresponds to Tb in FIG. 3.

Alternatively, the pulse width instruction value S6 may also indicate the off time $T_{OFFL}$ of the low-voltage side transistor M2. The value S6–K obtained by subtracting a constant K by the pulse width instruction value S6 can be compared with the pulse width detection value S5 by the digital comparator 336. S6–K corresponds to Ta in FIG. 3, and S5 corresponds to Tb in FIG. 3.

Hence, according to the driving device 300 in the embodiment, the direction, i.e. the phase of the coil current $I_U$, may be determined by using the pulse width Tb of the terminal voltage $V_U$ without inserting a non-conduction period, so as to drive the fan motor 202 that demonstrates low noise and/or low vibration.

The present disclosure also investigates the following technique. To replace the phase determination of the coil current by using the pulse width Tb of the terminal voltage $V_U$, a phase determination method using a voltage level of a protruding portion $T_D'$ of the terminal voltage $V_U$ corresponding to the idle time $T_D$ is performed (hereinafter the "comparison technology").

Generally, the idle time $T_D$ is set to be extremely short. In addition, in comparison with the idle time $T_D$, the on time and the off time of the high-voltage side transistor M1 and the low-voltage side transistor M2 are too long to be ignored, and there is a shift for the on time and the off time at each transistor. Due to this situation, it is difficult to accurately predict the time sequence of the protruding portion $T_D'$ of the terminal voltage $V_U$. Due to this reason, the phase of the coil current cannot be determined by the comparison technology.

On the contrary, in the phase determination method of the present embodiment, since the pulse width of the terminal voltage $V_U$ is in focus, even though the protruding portions $T_D'$ of the terminal voltage $V_U$ are set sequentially in time, the negative influence is inhibited and the phase of the coil current can be detected.

The method for detecting the phase information of the coil current by the current phase detection portion 330 is discussed in the following.

In addition to the above configuration, the driving device 300 in FIG. 1 further includes a frequency modulation portion 340.

The frequency of the waveforms of the driving voltage $V_U \sim V_W$ (conductive waveforms) are modulated by the frequency modulation portion 340 based on the current phase detection signal $S3_U$. The frequency of the conductive waveform is not the on/off frequency of the pulse width modulation, but corresponding to the frequency of an envelope of the driving voltages $V_U$, $V_V$, and $V_W$.

More specifically, the frequency modulation portion 340 makes a current zero crossing point at direction inversion of the coil current $I_U$ of the phase U and the phase reference satisfy a specific relationship, so as to modulate the frequency f of the conductive waveform based on the current phase detection signal $S3_U$.

Figure 4:
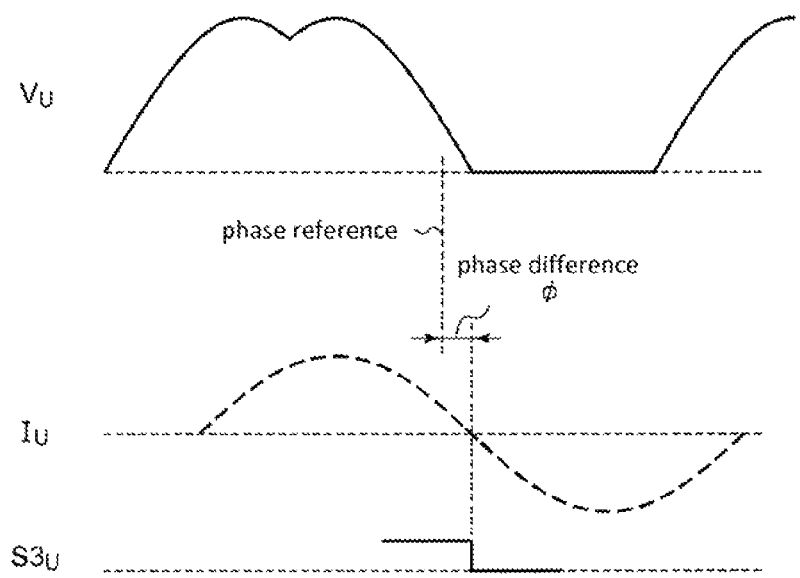
FIG. 4 is a diagram showing the relationship among a driving voltage (a conductive waveform) $V_U$, coil current $I_U$ and a current zero crossing point in accordance with some embodiments of the present disclosure.

FIG. 4 is a diagram showing the relationship among the driving voltage $V_U$ (conductive waveform), the coil current $I_U$, and the current zero crossing point. The phase reference is set in a manner that when the phase reference is consistent with the current zero crossing point ($\phi=0$), the driving efficiency is increased or the high torque is obtained.

Figure 5:
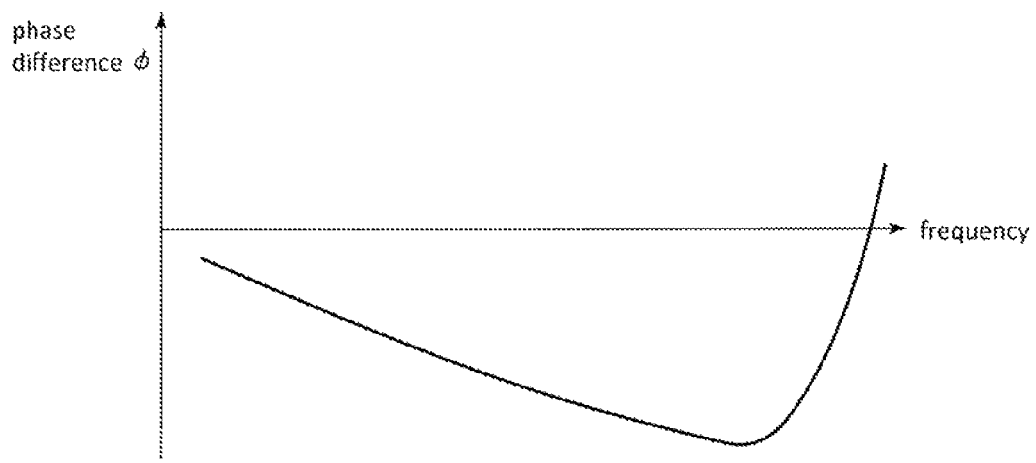
FIG. 5 is a diagram showing the relationship among frequency f of a conductive waveform, a phase reference and a phase difference $\phi$ of a current zero crossing point in accordance with some embodiments of the present disclosure.

FIG. 5 is a diagram showing the relationship between the frequency f of the conductive waveform and the phase difference $\phi$ between the phase reference and the current zero crossing point. In the situation that the current zero crossing point lags the phase reference, the frequency f is increased by the frequency modulation portion 340. In the situation that the current zero crossing point leads the phase reference, the frequency f is decreased by the frequency modulation portion 340.

The frequency is controlled by the frequency modulation portion 340 such that phase difference $\phi$ may be maintained as zero and the fan motor 202 is driven by the optimal rotation number, so as to achieve high efficiency.

Figure 6A:
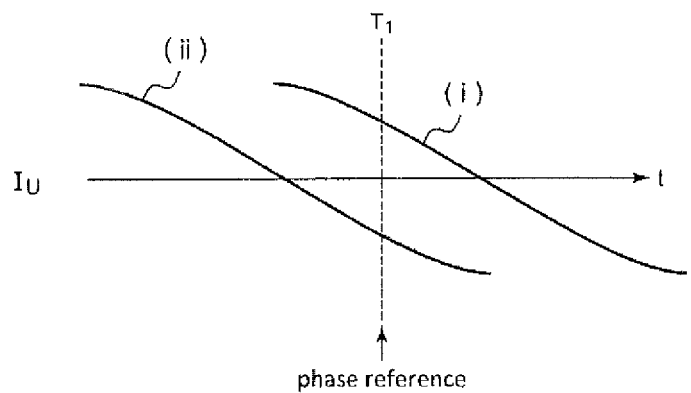
FIGS. 6A, 6B, and 6C are diagrams showing frequency control by using a frequency modulation portion in accordance with some embodiments of the present disclosure.
Figure 6B:
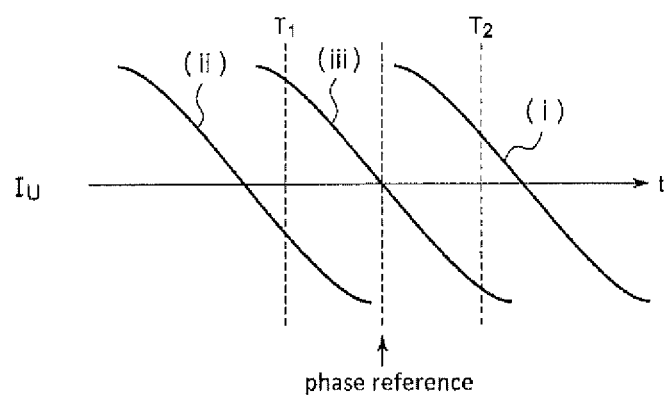
Figure 6C:
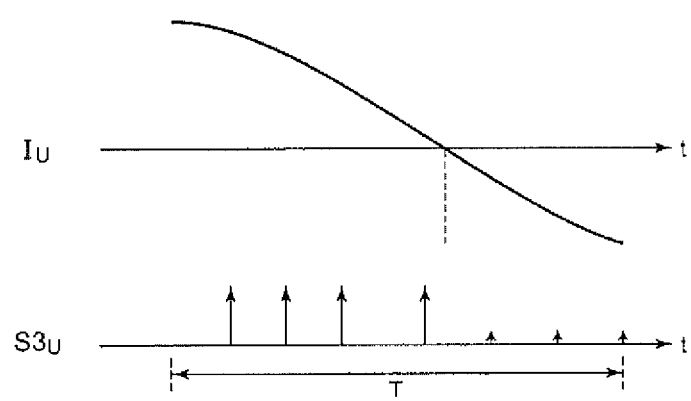

FIG. 6A to FIG. 6C are diagrams showing the frequency control by the frequency modulation portion 340. In FIG. 6A and FIG. 6B, one or multiple detection time sequences are set corresponding to the phase reference by the frequency modulation portion 340, and the frequency f is controlled by the frequency modulation portion 340 according to the direction of the coil current $I_U$ at each detection time sequence.

In FIG. 6A, the detection time sequence $T_1$ is set at the phase reference. Further, at the detection time sequence $T_1$, when (i) the coil current $I_U$ is positive, i.e. the phase of the coil current $I_U$ is lagging, the coefficient $\alpha$ ($\alpha>1$) is multiplied by the frequency f so as to increase the frequency f; and when (ii) the coil current is negative, i.e. the phase of the coil current $I_U$ is leading, the coefficient $\beta$ ($\beta<1$) is multiplied by the frequency f so as to decrease the frequency f.

In FIG. 6B, a plurality of detection time sequences $T_1$, $T_2$ are set before, after, and around the phase reference, and the frequency f is modulated according to the combination of the direction of the coil current $I_U$ at each of the plurality of detection time sequences $T_1$, $T_2$. (i) When the coil current $I_U$ are both positive at the detection time sequences $T_1$, $T_2$, the phase of the coil current $I_U$ is determined as lagging, and the coefficient α (α>1) is multiplied by the frequency f so as to increase the frequency f. Further, (ii) when the coil current $I_U$ are both negative at the detection time sequences $T_1$, $T_2$, the phase of the coil current $I_U$ is determined as leading, the coefficient β (β<1) is multiplied by the frequency f so as to decrease the frequency f. (iii) When the coil current $I_U$ is positive at the detection time sequence $T_1$ and the coil current $I_U$ is negative at the detection time sequence $T_2$, it is determined that the current zero crossing point is around the phase reference (between $T_1$ and $T_2$), and the frequency f is maintained. According to the control in FIG. 6B, the frequency vibration may be prevented.

More than three detection time sequences may be set. In this situation, since the phase difference ϕ may be determined, the coefficients α and β may be changed according to the phase difference ϕ. Accordingly, the system is stabilized at a high speed.

In FIG. 6C, the time of the current zero crossing point at direction inversion of the coil current $I_U$ of the phase U is detected by the frequency modulation portion 340 based on a plurality of current phase detection signals $S3_U$ during a complete period T. In such control, since the amount of the phase difference ϕ may be determined, the feedback control such as the zeroing phase difference ϕ may be performed. For example, the frequency modulation portion 340 may also include a P (proportional) controller, a PI (proportional-integral) controller and a PID (proportional-integral-differential) controller.

Second Embodiment

Figure 7:
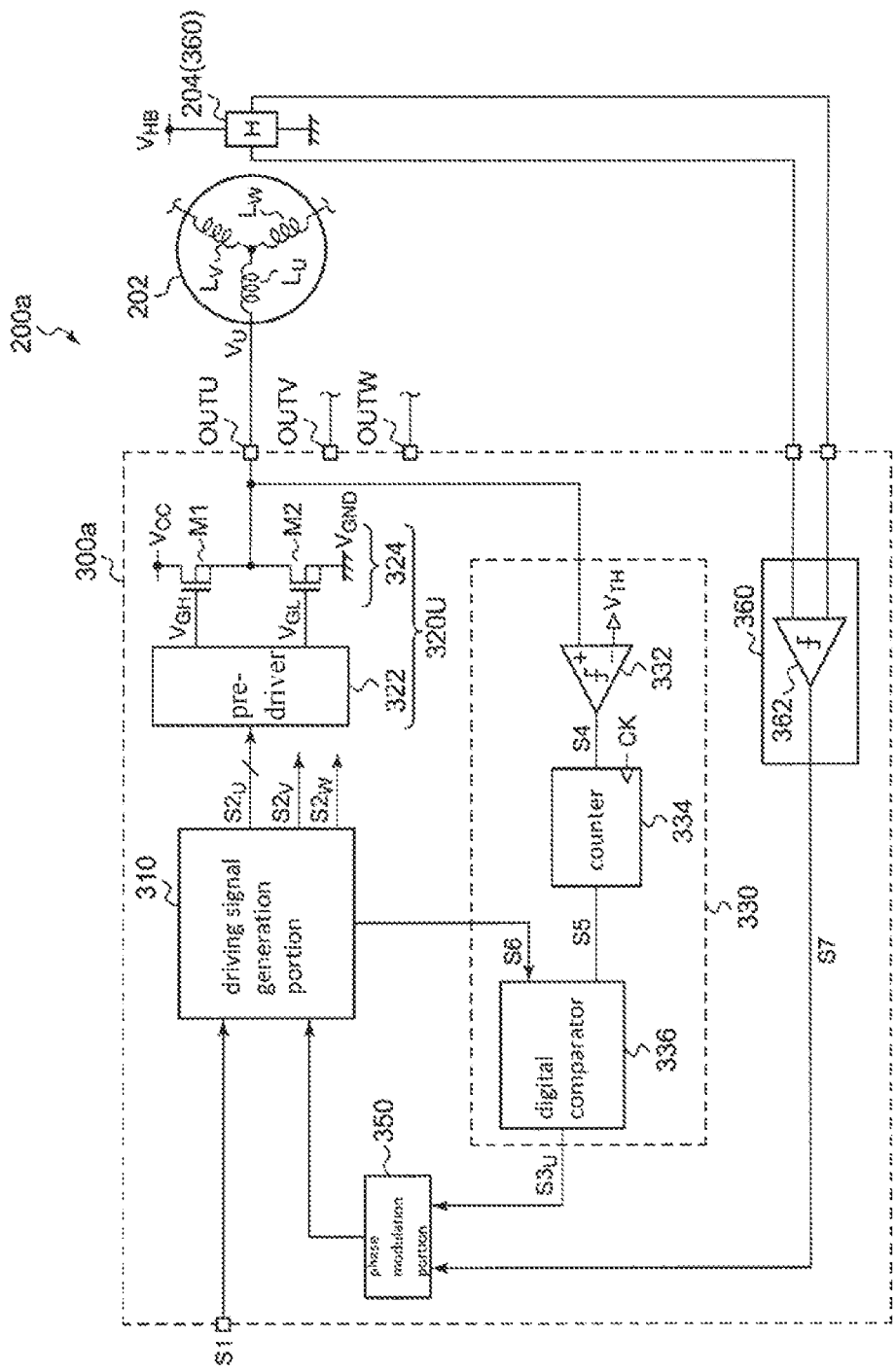
FIG. 7 is a circuit diagram showing a driving device in accordance with a second embodiment of the present disclosure.

FIG. 7 is a circuit diagram showing a driving device 300a in accordance with the second embodiment of the present disclosure. The driving device 300a includes a phase modulation portion 350 and a voltage zero crossing detection portion 360 for replacing the frequency modulation portion 340 of the driving device 300 shown in FIG. 1.

The phases of the control pulse signals $S2_U$, $S2_V$ and $S2_W$ are modulated by the phase modulation portion 350 based on the current phase detection signal $S3_U$ generated by the current phase detection portion 330. In other words, the phases of the driving voltages $V_U$~$V_W$ (conductive waveforms) are modulated.

The voltage zero crossing point at which the induced voltage of the coil $L_U$ generated at the specific phase (for example, the phase U) being zero is detected by the voltage zero crossing detection portion 360, and a voltage zero crossing detection signal S7 of a level shift corresponding to each voltage zero crossing point is generated by the voltage zero crossing detection portion 360. For example, the voltage zero crossing detection portion 360 may also include a Hall element 204 for generating a pair of Hall signals indicating a position of a rotor; and a Hall comparator 362 for comparing the Hall signals from the Hall element 204 and generating a Hall detection signal S7.

The phase modulation portion 350 makes the current zero crossing point at direction inversion of the coil current $I_U$ of the phase U consistent with the voltage zero crossing point, and modulates the phase of the control pulse signal S2 based on the current phase detection signal $S3_U$.

The configuration of the driving device 300a is described in the above disclosure.

According to the driving device 300, the direction-switching control is performed based on the current phase detection signal S3. In other words, a phase leading angle (or a phase lagging angle) is determined by the phase modulation portion 350 based on the current phase detection signal S3, and the direction-switching is performed relatively to the voltage zero crossing point indicated by the voltage zero crossing detection signal S7 at the time sequence shifting the phase leading angle (phase lagging angle). It means that the current phase detection signal S3 is reflected to the time sequence of the direction-switching by the phase modulation portion 350, such that the phase relationship between the coil current $I_U$ and the induced voltage e approaches a specific relation (for example, in phase), so as to drive the fan motor 202 with high efficiency or high torque.

The present disclosure is discussed based on the above embodiments. The embodiments are exemplary, and people having ordinary skill in the art would understand various changes may be made to each element or each processing step and can still fall within the scope of the present disclosure. The variation examples are discussed as follows.

First Variation Example

It is discussed in the first embodiment and the second embodiment that the current phase detection signal S3 is generated by the current phase detection portion 330 based on the pulse width of the terminal voltage $V_U$ at the phase U; however, the present disclosure is not limited to these embodiments. For example, the pulse widths of the terminal voltages $V_U$~$V_W$ at all the phases, the phase U, the phase V, and the phase W, can be detected.

In the first embodiment, the frequency control is performed by the frequency modulation portion 340 based on the phase difference $ϕ_U$~$ϕ_W$ between the current zero crossing point of each of the phases U~W and the phase reference. In this situation, the frequency control at all the phases can be performed at a speed three times greater than the frequency control at the phase U only.

Alternatively, the phase difference $ϕ_U$~$ϕ_W$ may be averaged by the frequency modulation portion 340, and the phase control is performed based on the average value. Such situation is effective when the deviation of the phase difference at each phase is large.

Further, in the second embodiment, the phase control of the conductive waveform is performed by the phase modulation portion 350 based on the difference between the current zero crossing point and the voltage zero crossing point at each of the phases U~W. In this situation, the frequency control at all the phases can be performed at a speed three times greater than the frequency control at the phase U only.

Alternatively, the difference between the current zero crossing point and the voltage zero crossing point obtained at the phases U~W can be averaged by the phase modulation portion 350, and the phase control is performed by the phase modulation portion 350 based on the average value. Such situation is effective when the deviation of the phase difference at each phase is large.

Alternatively, the pulse width of the terminal voltage at the phase V only or at the phase W only may be detected, or the pulse widths of terminal voltages at any of the two phases may be detected.

Second Variation Example

FIG. 3, FIG. 4 and FIGS. 6A-6C explain the example that the pulse width of the terminal voltage during the period where the coil current $I_U$ is decreasing; however, the present disclosure is not limited to this example. For example, the pulse width of the terminal voltage is detected by the voltage zero crossing detection portion 360 during both the period where the coil current is increasing and the period where the coil current is decreasing, or only during the period where the coil current is increasing.

Third Variation Example

The high level period of each signal is set as the pulse width, but the present disclosure is not limited to this embodiment. The pulse width of the control pulse signal $S2_U$ can be set as the low level period Tc by the current phase detection portion 330, and the pulse width of the terminal voltage (i.e. the detection pulse signal S4) $V_U$ can be set as the low level period Td by the current phase detection portion 330, and the pulse widths are compared.

The pulse width instruction value S6 may also indicate the on time $T_{ONL}$ of the low-voltage side transistor M2. The value obtained by adding the pulse width instruction value S6 and a constant K can be compared with the pulse width detection value S5 by the digital comparator 336. S6+K corresponds to Tc in FIG. 3, and S5 corresponds to Td in FIG. 3.

Alternatively, the pulse width instruction value S6 may also indicate the off time $T_{OFFH}$ of the high-voltage side transistor M1. The value S6−K obtained by subtracting a constant K from the pulse width instruction value S6 can be compared with the pulse width detection value S5 by the digital comparator 336. S6−K corresponds to Tc in FIG. 3, and S5 corresponds to Td in FIG. 3.

Fourth Variation Example

It is discussed in the second embodiment that the voltage zero crossing point is detected by using a Hall element 204, but the present disclosure is not limited to this embodiment. For example, the voltage zero crossing detection portion 314 may also include a counter-electromotive force detection comparator for comparing the terminal voltage $V_U$ and the middle point voltage $V_{COM}$ of the coil when the terminal of the coil $L_U$ at a specific phase (for example, the phase U) of the brushless direction current motor is in high impedance status.

Alternatively, the position of the rotor i.e., the voltage zero crossing point, can be detected by the voltage zero crossing detection portion 360 using a coil, an encoder or a decomposer.

Fifth Variation Example

It is discussed in the second embodiment that the phase of the coil current $I_U$ is consistent with the induced voltage e, but the present disclosure is not limited to this embodiment. The following situation may be considered according to the type or use of the motor. In view of efficiency or torque, it is better to have a slight phase shift in comparison with exactly in phase. In this situation, the target position of the phase of the coil current may be arbitrarily set by shifting the detection period before or after with respect to the voltage zero crossing point.

Sixth Variation Example

It is discussed that the phase of the coil current $I_U$ is detected by comparing the pulse width of the terminal voltage with the pulse width of the control pulse signal, but the present disclosure is not limited to this embodiment. For example, when the detection time sequence is fixed, and the pulse width of the control pulse signal is fixed to a constant value, only the pulse width of the terminal voltage and the threshold value corresponding to the specific value are compared.

Seventh Variation Example

The number of phases of a brushless direct current motor is not particularly limited. For example, the brushless direct current motor may be a single phase motor.

Eighth Variation Example

It is discussed that the electronic machine is equipped with the cooling device 200 for cooling the CPU, but the application of the present disclosure is not limited to this embodiment. The present disclosure may be used for cooling a heat generating body. More specifically, the application of the driving device 300 in this embodiment is not limited to driving a fan motor. The driving device 300 of the present disclosure may be used for driving various types of motors.

Although the present disclosure is discussed in the embodiments and described with specific terms, the embodiments only show the principle or applications of the present disclosure. Variations and changes to the arrangement may be made without departing from the spirit and scope of claims of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A driving device for a brushless direct current motor, comprising:
   a driving signal generation portion, generating a pulse-modulated control pulse signal at each phase;
   a driver, generating, at each phase, a driving voltage with duty cycle corresponding to the control pulse signal, the driving voltage being inserted with specific idle time, and applying the driving voltage to a coil of each phase; and
   a current phase detection portion, generating a current phase detection signal indicating a phase of current flowing in the coil at a specific phase corresponding to the control pulse signal, according to a pulse width of a terminal voltage of a terminal of the coil at the specific phase.

2. The driving device of claim 1, wherein the current phase detection signal is generated by the current phase detection portion according to relationship between a pulse width of the control pulse signal and the pulse width of the terminal voltage.

3. The driving device of claim 1, further comprising a frequency modulation portion for modulating frequency of a conductive waveform according to the current phase detection signal.

4. The driving device of claim 3, wherein the frequency modulation portion makes a current zero crossing point at direction inversion of coil current of the specific phase and a phase reference satisfy a predetermined relationship, so as to modulate the frequency of the conductive waveform according to the current phase detection signal.

5. The driving device of claim 4, wherein a time sequence is set by the frequency modulation portion according to the phase reference, and the frequency of the conductive waveform is modulated by the frequency modulation portion according to a direction of the coil current indicated by the current phase detection signal.

6. The driving device of claim 4, wherein the current zero crossing point at the direction inversion of the coil current of the specific phase is detected by the frequency modulation portion according to a plurality of the current phase detection signals in a complete period.

7. The driving device of claim 2, wherein the current phase detection portion comprises:
a voltage comparator, comparing the terminal voltage and a predetermined threshold voltage, and outputting a detection pulse signal;
a counter, detecting a pulse width of the detection pulse signal, and generating a pulse width detection value; and
a digital comparator, comparing a pulse width instruction value corresponding to the pulse width of the control pulse signal with the pulse width detection value.

8. The driving device of claim 7, wherein the driver comprises a high-voltage side transistor and a low-voltage side transistor, and a value obtained by adding the pulse width instruction value indicating on time of the high-voltage side transistor and a constant is compared to the pulse width detection value by the digital comparator.

9. The driving device of claim 8, wherein the constant is determined according to duration of the idle time.

10. The driving device of claim 1, wherein the brushless direct current motor is a three-phase motor, and the pulse width of the terminal voltage is detected by the current phase detection portion at each of a phase U, a phase V and a phase W.

11. The driving device of claim 1, wherein the brushless direct current motor is a three-phase motor, and the pulse width of the terminal voltage is detected by the current phase detection portion at both a coil current increasing period and a coil current decreasing period.

12. The driving device of claim 1, further comprising a phase modulation portion for modulating a phase of the control pulse signal according to the current phase detection signal.

13. The driving device of claim 12, further comprising a voltage zero crossing detection portion for detecting a voltage zero crossing point at which an induced voltage of the coil at the specific phase being zero, and wherein a direction of the coil current at the specific phase is determined by the phase modulation portion according to the current phase detection signal, and the current zero crossing point at the direction inversion of the coil current and the voltage zero crossing point are made consistent by the phase modulation portion so as to modulate the phase of the control pulse signal.

14. The driving device of claim 13, wherein the voltage zero crossing detection portion comprises a Hall comparator for comparing a pair of Hall signals from a Hall element indicating a position of a rotor of the brushless direct current motor, and generating a Hall detection signal.

15. The driving device of claim 13, wherein the voltage zero crossing detection portion comprises a counter-electromotive force detection comparator for comparing the terminal voltage and a middle voltage of the coil when the terminal of the coil at the specific phase of the brushless direct current motor is in a high impedance status.

16. A cooling device, comprising:
a fan motor; and
a driving device for a brushless direct current motor, comprising:
a driving signal generation portion, generating a pulse-modulated control pulse signal at each phase;
a driver, generating, at each phase, a driving voltage with duty cycle corresponding to the control pulse signal, the driving voltage being inserted with specific idle time, and applying the driving voltage to a coil of each phase; and
a current phase detection portion, generating a current phase detection signal indicating a phase of current flowing in the coil at a specific phase corresponding to the control pulse signal, according to a pulse width of a terminal voltage of a terminal of the coil at the specific phase;
wherein the brushless direct current motor driven by the driving device is the fan motor.

17. A driving method for a brushless direct current motor, comprising:
generating a modulated control pulse signal at each phase;
generating, at each phase, a driving voltage with duty cycle corresponding to the control pulse signal, the driving voltage being inserted with specific idle time, and applying the driving voltage to a coil of each phase; and
generating a current phase detection signal indicating a phase of current flowing in the coil at a specific phase corresponding to the control pulse signal, according to a pulse width of a terminal voltage of a terminal of the coil at the specific phase.

18. The driving method of claim 17, further comprising modulating rotation frequency of the brushless direct current motor according to the current phase detection signal.

19. The driving method of claim 17, wherein a phase of the control pulse signal is modulated according to the current phase detection signal.

* * * * *